(12) United States Patent
Shirakawa et al.

(10) Patent No.: US 12,493,250 B2
(45) Date of Patent: Dec. 9, 2025

(54) EXTERNAL ADDITIVE PARTICLES, TONER, AND METHOD FOR PRODUCING EXTERNAL ADDITIVE PARTICLES

(71) Applicant: CANON KABUSHIKI KAISHA, Tokyo (JP)

(72) Inventors: Jun Shirakawa, Saitama (JP); Akio Maruyama, Tokyo (JP); Kei Inoue, Kanagawa (JP); Waka Hasegawa, Tokyo (JP); Yukio Nagase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 17/535,462

(22) Filed: Nov. 24, 2021

(65) Prior Publication Data

US 2022/0171305 A1 Jun. 2, 2022

(30) Foreign Application Priority Data

Dec. 2, 2020 (JP) .................................. 2020-200521
Sep. 9, 2021 (JP) .................................. 2021-146787

(51) Int. Cl.

| G03G 9/097 | (2006.01) |
|---|---|
| C08F 212/08 | (2006.01) |
| C08F 220/28 | (2006.01) |
| C08K 3/30 | (2006.01) |
| C08K 5/42 | (2006.01) |
| C08K 5/544 | (2006.01) |

(52) U.S. Cl.
CPC ....... *G03G 9/09775* (2013.01); *C08F 212/08* (2013.01); *C08F 220/282* (2020.02); *C08K 3/30* (2013.01); *C08K 5/42* (2013.01); *C08K 5/544* (2013.01); C08K 2003/3045 (2013.01)

(58) Field of Classification Search
CPC .......... G03G 9/09775; G03G 9/08722; G03G 9/0802; G03G 9/08713; C08F 212/08; C08F 220/282; C08K 3/30; C08K 5/42; C08K 5/544; C08K 2003/3045
See application file for complete search history.

(56) References Cited

U.S. PATENT DOCUMENTS

| 2009/0053638 A1* | 2/2009 | Fukushima ........... G03G 9/0819 |
|---|---|---|
| | | 430/105 |
| 2010/0081074 A1* | 4/2010 | Sakai ................. G03G 9/09716 |
| | | 399/222 |
| 2017/0115588 A1 | 4/2017 | Fomitchev |

FOREIGN PATENT DOCUMENTS

| JP | 08202071 A | 8/1996 | |
|---|---|---|---|
| JP | 2016142811 A | 8/2016 | |
| JP | 6463154 B2 | 1/2019 | |
| JP | 6490436 B2 * | 3/2019 | ........... G03G 9/0802 |
| WO | 2016/026464 A1 | 2/2016 | |

OTHER PUBLICATIONS

JP-6490436-B2 translation (Year: 2024).*

* cited by examiner

Primary Examiner — Mark F. Huff
Assistant Examiner — Charles Collins Sullivan, IV
(74) Attorney, Agent, or Firm — Canon U.S.A., Inc. IP Division

(57) ABSTRACT

External additive particles including a polymer containing a sulfur atom and a nitrogen atom, wherein the polymer includes a vinyl polymer moiety and a siloxane moiety, relative to a total number of carbon atoms, oxygen atoms, and silicon atoms constituting the external additive particles, a ratio of a number of the silicon atoms constituting the external additive particles is 4.0% or more and 25.0% or less, and in surfaces of the external additive particles analyzed by X-ray photoelectron spectroscopy, relative to a total number of carbon atoms, nitrogen atoms, oxygen atoms, silicon atoms, and sulfur atoms, a ratio of a number of the nitrogen atoms is 0.40% or more and 2.50% or less, and a ratio of a number of the sulfur atoms is 0.05% or more and 0.25% or less.

13 Claims, No Drawings

EXTERNAL ADDITIVE PARTICLES, TONER, AND METHOD FOR PRODUCING EXTERNAL ADDITIVE PARTICLES

BACKGROUND OF THE INVENTION

Field of the Invention

The present disclosure relates to external additive particles, a toner used for an electrophotographic image-forming apparatus, and a method for producing external additive particles.

Description of the Related Art

In these years, there has been a demand for an electrophotographic image-forming apparatus that operates at higher speed and provides higher image quality. With this demand, a toner has been studied that has stress resistance for withstanding rubbing within the developing device for a long time, and that has high flowability and high developability for providing high image quality even in high-speed printing.

Japanese Patent Laid-Open No. 8-202071 discloses that a toner is prepared to contain a toner additive having an organic polymer skeleton and a polysiloxane skeleton, to thereby achieve improvement in flowability etc. of the toner.

The toner described in Japanese Patent Laid-Open No. 8-202071 was studied by the present inventors and, as a result, they have found that further improvements are necessary in temporal change in the flowability of the toner during output of images for a long time, and stability of the image density during output of images in low-humidity environments.

SUMMARY OF THE INVENTION

An embodiment of the present disclosure is directed to providing of external additive particles for providing a toner that can have high flowability, and can have high flowability retention during output of images for a long time and high density stability in low-humidity environments.

An embodiment of the present disclosure provides external additive particles including a polymer containing a sulfur atom and a nitrogen atom, wherein the polymer includes a vinyl polymer moiety and a siloxane moiety, relative to a total number of carbon atoms, oxygen atoms, and silicon atoms constituting the external additive particles, a ratio of a number of the silicon atoms constituting the external additive particles is 4.0% or more and 25.0% or less, and, in surfaces of the external additive particles analyzed by X-ray photoelectron spectroscopy, relative to a total number of carbon atoms, nitrogen atoms, oxygen atoms, silicon atoms, and sulfur atoms, a ratio of a number of the nitrogen atoms is 0.40% or more and 2.50% or less, and a ratio of a number of the sulfur atoms is 0.05% or more and 0.25% or less.

An embodiment of the present disclosure provides a toner that can have high flowability, and can have high flowability retention during output of images for a long time and high density stability in low-humidity environments.

Further features of the present disclosure will become apparent from the following description of exemplary embodiments.

DESCRIPTION OF THE EMBODIMENTS

Numerical ranges described in the form of "a value or more and another value or less" or "a value to another value" mean numerical ranges including the lower limits and the upper limits at the end points unless otherwise specified. When numerical ranges are described in series, the upper limits and the lower limits of the numerical ranges can be appropriately combined.

In the present disclosure, the (alkyl)amino group means an amino group, a monoalkylamino group, or a dialkylamino group. Such an alkyl can have 1 to 6 carbon atoms.

In the present disclosure, $SiO_{N/2}$ is defined as a unit in which, of the four bonds of the silicon atom, N bonds are formed with oxygen atoms, and these N oxygen atoms each bond to Si. In other words, $SiO_{N/2}$ is defined as a unit in which the N oxygen atoms each form a siloxane bond (Si—O—Si).

The present inventors performed thorough studies and, as a result, have found that a toner to which external additive particles having the above-described features are externally added can have high flowability and can have high flowability retention. Hereinafter, the features will be described in detail.

Sulfur Atoms in Surface Regions of External Additive Particles

The polymer according to the present disclosure contains a sulfur atom and, in the surfaces of the external additive particles analyzed by X-ray photoelectron spectroscopy, relative to the total number of carbon atoms, nitrogen atoms, oxygen atoms, silicon atoms, and sulfur atoms, the ratio of the number of the sulfur atoms is 0.05% or more and 0.25% or less. Thus, the surface regions of the external additive particles contain sulfur atoms. The polymer contains a sulfur atom and the surface regions of the external additive particles contain sulfur atoms, so that a toner that has high flowability retention tends to be provided, which has been found by the present inventors. The reason why the flowability retention is improved has not been clarified, but is inferred by the present inventors as follows.

Sulfur, which is an element in the third period, has a larger principal quantum number than elements in the second period such as carbon, and hence atomic orbitals have a small energy difference therebetween and the orbitals tend to be hybridized. Thus, the orbitals tend to be distorted by an external electrostatic field. Specifically, the sulfur atom has relatively high polarizability, and the polarized region inferentially tends to cause electrostatic interaction with the external region. Also, in a case where the sulfur atom is present in a state of being covalently bonded to an atom having a high electronegativity such as an oxygen atom, polarization also occurs in the bond between the sulfur atom and the oxygen atom, and the polarized region inferentially tends to cause electrostatic interaction with the external region. The surface regions of the external additive particles include such polarized regions, hence tend to strongly interact with regions that are present in the surfaces of the toner particles and that can undergo electrostatic interaction, so that the external additive particles inferentially become less likely to separate from the surfaces of the toner particle. As a result, a toner tends to be provided that can have high flowability retention even during output of images for a long time, which is inferred by the present inventors.

In addition, the present inventors infer that, when the ratio of the number of sulfur atoms is within the above-described range, the interaction between the surfaces of the toner particles and the external additive particles tends to be appropriately controlled. The ratio of the number of sulfur atoms is preferably 0.10% or more and is preferably 0.20% or less.

Examples of the form of such a sulfur atom in the region that tends to cause electrostatic interaction include a sulfo group (—$SO_3H$), a sulfuric acid group (—$OSO_3H$), and sodium salts and potassium salts of the foregoing. Thus, the polymer according to the present disclosure can be a polymer including at least one functional group selected from the group consisting of —$SO_3H$, —$SO_3Na$, —$SO_3K$, —$OSO_3H$, —$OSO_3Na$, and —$OSO_3K$. In the surfaces of the external additive particles analyzed by X-ray photoelectron spectroscopy, the sulfur atoms detected can be sulfur atoms each included in at least one functional group selected from the group consisting of —$SO_3H$, —$SO_3Na$, —$SO_3K$, —$OSO_3H$, —$OSO_3Na$, and —$OSO_3K$.

A method of making the polymer and the surface regions of the external additive particles according to the present disclosure contain a sulfo group or a salt thereof may be, for example, a method of using, as a material for the polymer described later, a radical-polymerizable sulfonate such as sodium p-styrenesulfonate. A method of making the polymer and the surface regions of the external additive particles according to the present disclosure contain a sulfuric acid group or a salt thereof may be a method of using, as a radical polymerization initiator, a persulfate such as potassium peroxodisulfate. In the case of using, as the radical polymerization initiator during production of the polymer, potassium peroxodisulfate, —$OSO_3K$ or —$OSO_3H$ is introduced into a terminal of the polymer, to thereby achieve introduction of the sulfur atom into the polymer produced.

Nitrogen Atoms in Surface Regions of External Additive Particles

The polymer according to the present disclosure contains a nitrogen atom and, in the surfaces of the external additive particles analyzed by X-ray photoelectron spectroscopy, relative to the total number of carbon atoms, nitrogen atoms, oxygen atoms, silicon atoms, and sulfur atoms, the ratio of the number of the nitrogen atoms is 0.40% or more and 2.50% or less. Thus, the surface regions of the external additive particles contain nitrogen atoms. The ratio of the number of nitrogen atoms is preferably 1.00% or more and is preferably 2.00% or less. By using a toner containing external additive particles in which the polymer contains a nitrogen atom and the surface regions have a nitrogen atom content satisfying such a range, the density of output images in low-humidity environments tends to be stabilized, which has been found by the present inventors. The reason why the output images have improved density stability is not clarified, but is inferred by the present inventors as follows.

In a process in which the toner gains charges by triboelectric charging, for example, due to functional groups having negative chargeability and being present in the surfaces of the external additive particles and in the surfaces of the toner particles, negative charges tend to be accumulated in the toner. When the surface regions of the external additive particles contain nitrogen atoms, compounds containing nitrogen atoms tend to, for example, function as bases, to receive hydrogen ions to have positive charges, so that, in the toner as a whole, negative charges tend not to be excessively accumulated. As a result, the toner becomes less likely to be excessively charged, so that, even in low-humidity environments, the toner that is less likely to cause variations in image density tends to be provided, which is inferred by the present inventors.

In addition, when the ratio of the number of nitrogen atoms is in such a range, the balance between the amount of positive charges and the amount of negative charges in the surface regions of the external additive particles tends to be appropriately controlled, which is inferred by the present inventors. Furthermore, from the viewpoint of inferentially controlling the balance more appropriately and tending to provide high stability of image density, in the surfaces of the external additive particles analyzed by X-ray photoelectron spectroscopy, relative to the number of sulfur atoms, the ratio of the number of nitrogen atoms is preferably 2.0 or more, more preferably 7.0 or more, still more preferably 8.0 or more. The upper limit is not particularly limited, and is preferably 20.0 or less, preferably 10.0 or less, still more preferably 9.0 or less. In the surfaces of the external additive particles analyzed by X-ray photoelectron spectroscopy, the nitrogen atoms detected can be nitrogen atoms included in the polymer according to the present disclosure.

The form of such a nitrogen atom is inferentially preferably an (alkyl)amino group and hence the polymer according to the present disclosure preferably includes an (alkyl) amino group. More preferably, the (alkyl)amino group is at least one of an amino group or a monoalkylamino group. In the surfaces of the external additive particles analyzed by X-ray photoelectron spectroscopy, the nitrogen atoms detected can be nitrogen atoms contained in such (alkyl) amino groups.

A method of making the polymer according to the present disclosure contain an (alkyl)amino group may be, for example, a method of making an amine compound described later react with a polymer including a vinyl polymer moiety and a siloxane moiety, to bond together the polymer and the amine compound.

Alternatively, the form of the nitrogen atom contained in the polymer may be a trialkylammonium group. Thus, the polymer according to the present disclosure may include a trialkylammonium group.

Polymer Including Vinyl Polymer Moiety and Siloxane Moiety

The polymer according to the present disclosure includes a vinyl polymer moiety and a siloxane moiety.

The vinyl polymer moiety in the polymer is an organic polymer moiety provided by polymerization of a vinyl-based polymerizable monomer. The polymer included in the external additive particles contains the vinyl polymer moiety, so that the external additive particles tend to have higher affinity for the resin forming the toner particles, and inferentially become less likely to separate from the toner particles.

The polymer included in the external additive particles includes, in addition to the vinyl polymer moiety, a siloxane moiety. As a result, the external additive particles including the polymer according to the present disclosure tend to have sufficient mechanical strength, and tend to become external additive particles that are less likely to undergo plastic deformation. Thus, a toner to which the external additive particles are externally added can have high flowability.

As one of the forms of the polymer according to the present disclosure, in the polymer, vinyl polymer chains can be crosslinked with siloxane bonds. When the external additive particles include the polymer, the external additive particles inferentially tend to have higher mechanical strength, and become less likely to undergo plastic deformation. Similarly, as one of the forms of the polymer according to the present disclosure, the polymer can have a structure in which molecular chains of a vinyl-based polymer are bonded together with siloxane bonds.

Particles having a polysiloxane skeleton alone, such as silica particles, have high mechanical strength, but have low affinity for the resin forming the toner particles, so that, in the case of outputting images for a long time, the flowability of the toner tends to decrease.

Alternatively, particles having an organic polymer skeleton alone, such as polymethyl methacrylate-based particles, have low mechanical strength and hence, in the case of being used as external additive particles, due to mechanical impact within the development device etc., tend to undergo plastic deformation or breakage. As a result, the toner tends to adhere to various members, so that a toner that has high flowability and high flowability retention is less likely to be obtained.

A method of obtaining the polymer according to the present disclosure may be a method of using a vinyl-polymerizable monomer containing a silicon atom bonded to a hydrolyzable group such as a methoxy group to perform vinyl polymerization, and subsequently performing hydrolysis and polycondensation reactions of the hydrolyzable group to form siloxane bonds. In this method, vinyl polymerization is first performed to form vinyl polymer chains, and the subsequent hydrolysis and polycondensation form, in the polymer or between such polymers, siloxane bonds, to provide a polymer in which vinyl polymer chains are crosslinked with siloxane bonds.

Relative to the mass of the external additive particles, the content of the polymer according to the present disclosure is preferably 60.0 mass % or more, more preferably 70.0 mass % or more, more preferably 80.0 mass % or more, still more preferably 90.0 mass % or more.

Ratio of Number of Silicon Atoms Relative to Total Number of Carbon Atoms, Oxygen Atoms, and Silicon Atoms Relative to the total number of carbon atoms, oxygen atoms, and silicon atoms constituting the external additive particles, the ratio of the number of silicon atoms constituting the external additive particles is 4.0% or more and 25.0% or less.

Relative to the total number of carbon atoms, oxygen atoms, and silicon atoms constituting the external additive particles, the ratio of the number of silicon atoms constituting the external additive particles is considered as the index of the amount of siloxane moiety in the external additive particles by the present inventors.

When this ratio is 4.0% or more, the external additive particles include a sufficient amount of siloxane moiety and the external additive particles become less likely to undergo plastic deformation, so that a toner having high flowability tends to be obtained. When the ratio is 25.0% or less, the amount of siloxane moiety in the external additive particles tends not to become excessively large, and the external additive particles inferentially become less likely to become separated from the toner particles, so that a toner having high flowability retention tends to be obtained. Thus, the ratio is 25.0% or less, preferably 20.0% or less, more preferably 15.0% or less, still more preferably 10.0% or less. Thus, the ratio is still more preferably 4.0% or more and 10.0% or less. The ratio is more preferably 8.0% or less.

From the viewpoint that a toner having high flowability retention tends to be obtained, the ratio of the number of carbon atoms constituting the external additive particles relative to the number of silicon atoms constituting the external additive particles is preferably 6.5 or more, more preferably 7.5 or more, still more preferably 13.5 or more. The upper limit is not particularly limited, but is, from the viewpoint of flowability of the toner, preferably 20.0 or less, more preferably 17.0 or less.

Such a ratio of the number of atoms can be controlled by adjusting, during production of the polymer included in the external additive particles, for example, the type and amount of a monomer unit containing a silicon atom, and the type and amount of a monomer unit not containing silicon atoms.

During production of the polymer included in the external additive particles, the radical polymerization reaction may be followed by the hydrolysis reaction and polycondensation reaction, so that the above-described ranges of the ratio of the number of atoms tend to be satisfied. The details will be described later.

Monomer Units in Polymer

From the viewpoint that the proportions of carbon atoms, oxygen atoms, and silicon atoms tend to satisfy the above-described ranges and advantages of the present disclosure tend to be obtained, the polymer can contain a monomer unit represented by the following Formula (1).

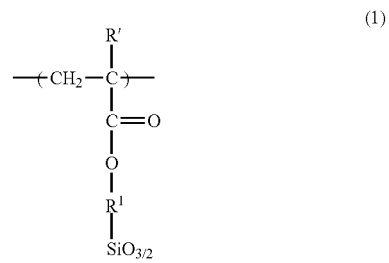

In Formula (1), $R^1$ is an alkylene group having 1 to 10 carbon atoms and R' is a hydrogen atom or a methyl group. The polymer according to the present disclosure can include, as one of forms containing a sulfur atom, a monomer unit represented by the following Formula (S).

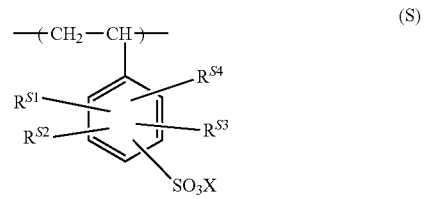

In Formula (S), $R^{S1}$ to $R^{S4}$ are each independently a hydrogen atom or a methyl group, and X is a hydrogen atom or an alkali metal atom. When the polymer includes the monomer unit, the polymer according to the present disclosure contains sulfur atoms and the surfaces of the external additive particles tend to contain sulfur atoms, so that the flowability retention of a toner to which the external additive particles containing the polymer are externally added can be improved. In Formula (S) above, examples of the alkali metal atom include Na and K. In Formula (S) above, the position of —$SO_3X$ can be the para position with respect to —$CH_2$—CH— in Formula (S) above. $R^{S1}$ to $R^{S4}$ can be hydrogen atoms.

Ratio of Unit T in External Additive Particles

The polysiloxane moiety included in the external additive particles can include the following four units.

Unit M: a unit in which a single oxygen atom is bonded to a single silicon atom

Unit D: a unit in which two oxygen atoms are bonded to a single silicon atom

Unit T: a unit in which three oxygen atoms are bonded to a single silicon atom

Unit Q: a unit in which four oxygen atoms are bonded to a single silicon atom

The ratios of these units can be determined from integral values provided by $^{29}$Si-NMR measurement. When the external additive particles according to the present disclosure are subjected to $^{29}$Si-NMR measurement, the following Formula (P1) can be satisfied.

$$\text{Integral value of Unit } T / \{(\text{Integral value of Unit } M) + (\text{Integral value of Unit } D) + (\text{Integral value of Unit } T) + (\text{Integral value of Unit } Q)\} \geq 60\%$$

When Formula (P1) above is satisfied, in the polysiloxane moiety in the external additive particles, moieties having three-dimensional bonds inferentially tend to be present. As a result, the external additive particles tend to have sufficient mechanical strength, and the external additive particles tend to become less likely to undergo plastic deformation, which is inferred by the present inventors. The value of Formula (P1) is preferably 70% or more, preferably 80% or more, preferably 90% or more.

Ratios of Units T0 to T3 in Unit T in External Additive Particles

Unit T included in the polysiloxane moiety of the external additive particles has any one form of Unit T0, Unit T1, Unit T2, and Unit T3. Unit Tn (n=0, 1, 2, or 3) is a form in which, of the three oxygen atoms bonded to a silicon atom forming Unit T, n oxygen atoms are bonded to other silicon atoms; the ratio of the units can be determined from integral values measured by $^{29}$Si-NMR measurement. From the viewpoint of mechanical strength of the external additive particles, in the external additive particles subjected to $^{29}$Si-NMR measurement, the following Formula (P2) can be satisfied.

$$\{(\text{Integral value of Unit } T0) + (\text{Integral value of Unit } T1)\} / \{(\text{Integral value of Unit } T0) + (\text{Integral value of Unit } T1) + (\text{Integral value Unit } T2) + (\text{Integral value of Unit } T3)\} \leq 0.1 \quad \text{Formula (P2)}$$

From the viewpoint of flexibility and elasticity of the external additive particles, in the external additive particles subjected to $^{29}$Si-NMR measurement, the following Formula (P3) can be satisfied.

$$\text{Integral value of Unit } T2 / \{(\text{Integral value of Unit } T0) + (\text{Integral value of Unit } T1) + (\text{Integral value of Unit } T2) + (\text{Integral value of Unit } T3)\} \geq 0.35 \quad \text{Formula (P3)}$$

When Formula (P3) above is satisfied, specifically, the polysiloxane moiety of the external additive particles includes a sufficient amount of Unit T2, the external additive particles inferentially tend to have higher flexibility and elasticity. As a result, even after continuous output of images, the external additive particles are less likely to sink in the toner particles, and variations in the image density due to sinking of the external additive particles are less likely to occur, which is inferred by the present inventors. Furthermore, from the viewpoint of flexibility and elasticity of the external additive particles, in the external additive particles subjected to $^{29}$Si-NMR measurement, the ratio of the integral value of Unit T2 to the integral value of Unit T3 can be 1 or more. The integral values in the $^{29}$Si-NMR measurement can be controlled by changing, during production of the polymer included in the external additive particles, for example, the type and amount of a monomer unit containing a silicon atom. The integral value of Unit T2 can also be controlled by adjusting the reaction pH during production of the polymer included in the external additive particles.

D50 of External Additive Particles

In order that the external additive particles have an appropriate volume-average particle size, when a particle size of the external additive particles at 50% of a volume-based distribution is defined as D50, D50 can be 50 nm or more and 200 nm or less.

Method for Producing External Additive Particles

During production of the external additive particles, a compound including a radical-polymerizable group and a hydrolyzable group that forms a siloxane bond by hydrolysis and polycondensation can be used to cause a radical polymerization reaction; subsequently, a hydrolysis reaction and a polycondensation reaction can be caused to obtain particles of a condensate. Furthermore, the particles of the polycondensate can be caused to react with an amine compound including a silyl group to which a hydrolyzable group is bonded. Specific examples of the amine compound will be described later. The radical polymerization reaction is first performed, so that the main skeleton of the polymer included in the external additive particles becomes a vinyl polymer moiety, the external additive particles inferentially tend to have higher affinity for the resin forming the toner, and the toner to which the external additive particles are externally added tends to have higher flowability.

The monomer material for the radical polymerization reaction can be made to contain a radical-polymerizable sulfonate or a persulfate can be used as a radical polymerization initiator, so that the polymer and the surface regions of the toner particles according to the present disclosure contain sulfur atoms.

Specifically, as an embodiment of the present disclosure, a method for producing external additive particles including a polymer can be a method for producing external additive particles including Step (i-1), Step (ii), and Step (iii), or Step (i-2), Step (ii), and Step (iii):

(i-1) a step of subjecting a monomer material containing a radical-polymerizable sulfonate and a compound represented by Formula (2) below to radical polymerization, to obtain a polymer including a hydrolyzable group in Formula (2);

(i-2) a step of using, as a radical polymerization initiator, a persulfate and subjecting a monomer material containing a compound represented by Formula (2) below to radical polymerization, to obtain a polymer including a hydrolyzable group in Formula (2);

(ii) a step of subjecting the hydrolyzable group in the polymer obtained by Step (i-1) or Step (i-2) above to hydrolysis and polycondensation, to obtain particles of a polycondensate; and (iii) a step of causing a reaction between the particles of the polycondensate and an amine compound including a silyl group to which a hydrolyzable group is bonded, to obtain particles including a polymer in which the polycondensate and the amine compound are bonded with a siloxane bond.

$$R^5{}_m SiX_{4-m} \quad (2)$$

In Formula (2), X is a hydrolyzable group; m is an integer of 1 to 3;

when m=1, $R^5$ is a radical-polymerizable group having 1 to 20 carbon atoms; and when m=2 to 3, of a plurality of $R^5$, at least one $R^5$ is a radical-polymerizable group having 1 to 20 carbon atoms, and one or more other $R^5$ not being radical-polymerizable groups are each independently an alkyl group having 1 to 20 carbon atoms.

In Formula (2), the number of carbon atoms of $R^5$ is preferably 1 to 15, more preferably 1 to 10; m is preferably 1 or 2, more preferably, m is 1.

After the radical polymerization reaction is performed, the hydrolyzable group in Formula (2) above is subjected to a hydrolysis reaction and a polycondensation reaction, to thereby provide external additive particles including a polymer in which a vinyl polymer is crosslinked with a siloxane bond. After the molecular chain of the vinyl-based polymer is formed, hydrolysis and polycondensation are performed, so that a polymer in which the ratio of the number of silicon atoms forming the external additive particles is controlled tends to be obtained as described above. The hydrolysis reaction and the polycondensation reaction are performed later, so that sulfur atoms and nitrogen atoms inferentially tend to be contained in the surface regions of the external additive particles.

In the particles of the polycondensate obtained in Step (ii) above, hydrolyzable groups (in particular, hydroxy groups) bonded to silicon atoms remain. In Step (iii), such a silicon atom bonded to such a hydrolyzable group and the silyl group to which a hydrolyzable group is bonded in the amine compound form a siloxane bond, to thereby achieve bonding between the polycondensate and the amine compound. Thus, the particles of the polycondensate can include hydrolyzable groups.

The silyl group can be bonded to three hydrolyzable groups. The silyl group to which a hydrolyzable group is bonded can be a silyl group to which an alkoxy group is bonded, namely an alkoxysilyl group.

The hydrolyzable group according to the present disclosure means a functional group that is bonded to a silicon atom and is, upon hydrolysis, turned into a hydroxy group, or a hydroxy group. For example, the hydrolyzable group may be at least one selected from the group consisting of a hydroxy group, a fluoro group, a chloro group, a bromo group, an iodo group, an alkoxy group, and an acyloxy group. A structure in which such hydrolyzable groups are bonded to silicon atoms is easily hydrolyzed by water, which is easily followed by a polycondensation reaction, so that siloxane bonds are easily formed. The alkoxy group is preferably a methoxy group, an ethoxy group, or a propoxy group. The acyloxy group is preferably an acetoxy group. The hydrolyzable group according to the present disclosure is more preferably a hydroxy group, a methoxy group, an ethoxy group, a propoxy group, or an acetoxy group, more preferably a methoxy group or an ethoxy group.

The radical-polymerizable group means a substituent including a radical-reactive double bond in the structure. Examples include a vinyl group, an acryloxyalkyl group, and a methacryloxyalkyl group.

The above-described radical-polymerizable sulfonate is an organic sulfonate compound including the above-described radical-polymerizable group.

Examples of the radical-polymerizable sulfonate include the following: sodium p-styrenesulfonate, potassium p-styrenesulfonate, lithium p-styrenesulfonate, magnesium p-styrenesulfonate, calcium p-styrenesulfonate, ammonium p-styrenesulfonate, sodium vinylsulfonate, potassium vinylsulfonate, lithium vinylsulfonate, magnesium vinylsulfonate, calcium vinylsulfonate, and ammonium vinylsulfonate. These radical-polymerizable sulfonates may be used alone or in combination of two or more thereof.

Examples of the persulfate used as the radical polymerization initiator include the following.

Examples include potassium persulfate, sodium persulfate, and ammonium persulfate. These persulfates may be used alone or in combination of two or more thereof.

From the viewpoint of flowability retention of the toner, the content of the radical-polymerizable sulfonate relative to the total mass of the monomer material is preferably 0.4 to 5.0 mass %, more preferably 0.7 to 1.0 mass %.

From the viewpoint of flowability of the toner, the content of the compound represented by Formula (2) above relative to the total mass of the monomer material is preferably 50 to 80 mass %, more preferably 60 to 75 mass %.

Radical Polymerization Reaction (Step (i-1), Step (i-2))

The process of causing the radical polymerization reaction can be an emulsion polymerization process. The emulsion polymerization process is a polymerization process in which a medium such as water, a monomer sparingly soluble in the medium, and an emulsifying agent (surfactant) or an ionic comonomer are mixed together and, to this, a polymerization initiator soluble in the medium is added.

The emulsion polymerization process can be a soap-free emulsion polymerization process of performing polymerization without using surfactants. In the case of the soap-free emulsion polymerization process, surfactants do not remain on the surfaces of the external additive particles, and affinity between the toner particles and the external additive particles is easily controlled, which is inferred by the present inventors.

Specific examples of the compound represented by Formula (2) above, specifically a monomer including both of a radical-polymerizable group and a hydrolyzable group, include the following.

Examples include organotrialkoxysilane compounds such as γ-methacryloxypropyltrimethoxysilane, γ-methacryloxypropyltriethoxysilane, γ-acryloxypropyltrimethoxysilane, γ-acryloxypropyltriethoxysilane, γ-methacryloxypropyltriacetoxysilane, vinyltrimethoxysilane, vinyltriethoxysilane, vinyltriacetoxysilane, 1-hexenyltrimethoxysilane, and 1-octenyltrimethoxysilane; organotriacetoxysilane; diorganodialkoxysilane compounds such as bis(γ-acryloxypropyl)dimethoxysilane, bis(γ-methacryloxypropyl)dimethoxysilane, γ-methacryloxypropylethyldimethoxysilane, γ-methacryloxypropylethyldiethoxysilane, γ-acryloxypropylethyldimethoxysilane, and γ-acryloxypropylethyldiethoxysilane; and triorganoalkoxysilane compounds such as tris(γ-acryloxypropyl)methoxysilane, tris(γ-acryloxypropyl)ethoxysilane, tris(γ-methacryloxypropyl)methoxysilane, tris(γ-methacryloxypropyl)ethoxysilane, bis(γ-acryloxypropyl)vinylmethoxysilane, bis(γ-methacryloxypropyl)vinylmethoxysilane, γ-acryloxypropyldiethylmethoxysilane, γ-acryloxypropyldiethylethoxysilane, γ-methacryloxypropyldiethylmethoxysilane, and γ-methacryloxypropyldiethylethoxysilane.

Of the above-described monomers, more preferred are γ-methacryloxypropyltrimethoxysilane, γ-methacryloxypropyltriethoxysilane, γ-acryloxypropyltrimethoxysilane, γ-acryloxypropyltriethoxysilane, γ-methacryloxypropyltriacetoxysilane, vinyltrimethoxysilane, vinyltriethoxysilane, and vinyltriacetoxysilane.

The compound represented by Formula (2) above, specifically a monomer including both of a radical-polymerizable group and a hydrolyzable group can be a monomer represented by Formula (3) below.

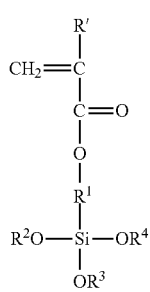

(3)

In Formula (3), $R^1$ is an alkylene group having 1 to 10 carbon atoms; $R^2$, $R^3$, and $R^4$ are each independently any one of hydrogen, a methyl group, and an ethyl group; R' is hydrogen or a methyl group.

The radical polymerization initiator used in the radical polymerization is not particularly limited, but is preferably at least one compound selected from a persulfate, an azo compound, and a peroxide, more preferably a persulfate. The amount of the radical polymerization initiator is not particularly limited, but is preferably, relative to the total mass of the raw material monomer, 0.1 to 10.0 mass %, more preferably 0.3 to 5.0 mass %. The amount of the radical polymerization initiator can be set in such a range because radical polymerization is caused to proceed sufficiently, and the heat generation amount in the reaction system is less likely to become excessively large.

The temperature of the radical polymerization can be appropriately selected in accordance with the type or amount of the radical polymerization initiator used, and is preferably in the range of 30 to 100° C., more preferably in the range of 50 to 80° C.

The steps of causing the radical polymerization, specifically, Step (i-1) and Step (i-2) according to the present disclosure are steps of causing radical polymerization preferably under a condition of 6.0≤pH≤8.0, more preferably 6.5≤pH≤7.5. When the reaction system has a pH in such a range, during the radical polymerization reaction, hydrolyzable groups are inferentially less likely to undergo hydrolysis and polycondensation reactions. After the radical polymerization, the hydrolysis and polycondensation reactions can be caused, so that sulfur atoms and nitrogen atoms, which tend to have higher polarity, tend to be contained in the surface regions of the external additive particles. For this reason, the radical polymerization reaction can be caused in a buffer solution. The buffer solution is not particularly limited, and can be a buffer solution having a pH in a region at and near the neutral, such as a phosphate buffer solution or a MES buffer solution.

During the radical polymerization, in addition to the monomer including both of a radical-polymerizable group and a hydrolyzable group, another monomer including a radical-polymerizable group may be used.

Examples of the other monomer include unsaturated carboxylic acids such as acrylic acid and methacrylic acid; unsaturated carboxylic acid esters such as acrylic acid esters, methacrylic acid esters, crotonic acid esters, itaconic acid esters, maleic acid esters, and fumaric acid esters; acrylamides; methacrylamides; and vinyl compounds such as aromatic vinyl compounds such as styrene, α-styrene, and divinylbenzene, vinyl esters such as vinyl acetate, and halogenated vinyl compounds such as vinyl chloride. These can be used alone or in combination of two or more thereof. Alternatively, a monomer including two or more radical-polymerizable groups such as divinylbenzene, trimethylolpropane trimethacrylate, or ethylene glycol dimethacrylate may be used. Hydrolysis reaction and polycondensation reaction (Step (ii))

The process of causing the hydrolysis reaction and the polycondensation reaction is not particularly limited; however, to an emulsion including particles obtained by radical polymerization, a catalyst such as an acid or a base can be added, and the emulsion can be directly subjected to hydrolysis and polycondensation to obtain particles of the polycondensate. In other words, Step (ii) can be a step in which a catalyst such as an acid or a base is added and, in the polymer obtained by Step (i-1) or Step (i-2), the hydrolyzable groups are subjected to hydrolysis and polycondensation, to obtain particles of the polycondensate. Step (ii) can be a step of causing hydrolysis and polycondensation under a condition of 2.0≤pH≤4.0. When hydrolysis and polycondensation are performed under this condition, it has been found that, of Units T of the polysiloxane moiety, the ratio of Unit T2 tends to increase. The particles obtained by radical polymerization may be subjected to a process such as filtration, centrifugation, or concentration under a reduced pressure to thereby be separated from the emulsion, and subsequently subjected to addition of a catalyst, to hydrolysis, and to polycondensation.

After formation of particles by the radical polymerization reaction, during hydrolysis and polycondensation reactions, a catalyst such as acetic acid, hydrochloric acid, ammonia, urea, alkanolamine, a tetraalkyl ammonium hydroxide, an alkali metal hydroxide, or an alkaline-earth metal hydroxide may be used.

From the viewpoint of further accelerating polycondensation, preferred examples of the catalyst include acetic acid, hydrochloric acid, organic titanium compounds such as titanium tetraisopropoxide, titanium tetrabutoxide, and diisopropoxy-bis(acetylacetonato) titanate; organic aluminum compounds such as aluminum triisopropoxide, aluminum tri-sec-butoxide, aluminum trisacetylacetonate, and aluminum isopropoxide-bisacetylacetonate; organic zirconium compounds such as zirconium tetrabutoxide and tetrakis(acetylacetoacetato) zirconium; organic tin compounds such as dibutyl tin diacetate, dibutyl tin diethyl hexanoate, and dibutyl tin dimaleate; and acidic phosphates. These may be used alone or in combination of two or more thereof. In particular, preferred is at least one selected from the group consisting of organic tin compounds and acidic phosphates. From the viewpoint of suppressing sinking of the external additive particles in the surfaces of the toner, at least one selected from acetic acid and hydrochloric acid is preferably used.

The solvent used during production of the external additive particles may contain an organic solvent other than water and catalysts. Specific examples of the organic solvent include alcohols such as methanol, ethanol, isopropanol, n-butanol, isobutanol, sec-butanol, t-butanol, pentanol, ethylene glycol, propylene glycol, and 1,4-butanediol; ketones such as acetone and methyl ethyl ketone; esters such as ethyl acetate; (cyclo)paraffins such as isooctane and cyclohexane; ethers such as dioxane and diethyl ether; and aromatic hydrocarbons such as benzene and toluene. These may be used in combination of two or more thereof.

The hydrolysis reaction and the polycondensation reaction can be caused by, for example, appropriately adding a catalyst to an emulsion prepared by a radical polymerization reaction, and stirring the emulsion in the range of 0 to 100° C., preferably 0 to 70° C., for 3 to 24 hours.

Reaction with Amine Compound Including Silyl Group to which Hydrolyzable Group is Bonded (Step (iii))

From the viewpoint of stability of density of output images, the particles of the polycondensate obtained in Step (ii) can be caused to react with an amine compound including a silyl group to which a hydrolyzable group is bonded, to obtain particles including a polymer in which the polycondensate and the amine compound are bonded with a siloxane bond. The reaction of forming the siloxane bond is a hydrolysis reaction and a polycondensation reaction. The reactions are caused to thereby form a siloxane bond between a silicon atom to which a hydrolyzable group is bonded in the polycondensate, and a silicon atom (silyl group) to which a hydrolyzable group is bonded in the amine compound. As a result, nitrogen atoms are incorporated into the polymer produced, so that the ratio of the number of nitrogen atoms in the surface regions of the external additive particles tends to be in the above-described range.

The amine compound used in Step (iii) can be a compound represented by the following Formula (4).

In Formula (4), $R^{41}$ and $R^{42}$ are each independently an alkyl group having 1 to 6 carbon atoms and optionally having an amino group, or a hydrogen atom; $R^{43}$ is an alkylene group having 1 to 6 carbon atoms; n is 0 to 2; $R^{44}$ is an alkyl group having 1 to 6 carbon atoms; Y is a hydrolyzable group. In Formula (4) above, $R^{41}$ and $R^{42}$ are preferably each independently an alkyl group having 1 to 3 carbon atoms and optionally having an amino group, or a hydrogen atom. $R^{41}$ and $R^{42}$ are preferably each independently an alkyl group having 1 to 3 carbon atoms or a hydrogen atom. $R^{43}$ is preferably an alkylene group having 2 to 4 carbon atoms. $R^{44}$ is preferably an alkyl group having 1 to 3 carbon atoms. n is preferably 0 or 1, more preferably 0. Specific examples include aminosilanes such as 3-aminopropyltrimethoxysilane, 3-(2-aminoethylamino)propyltrimethoxysilane, and 3-(2-aminoethylamino)propyldimethoxydimethylsilane.

From the viewpoint of chargeability of the toner, in order to treat hydroxy groups remaining in the surfaces of the external additive particles and to adjust the amount of negative charges, another surface treatment agent can be used to perform surface treatment of the external additive particles. Examples of the other surface treatment agent include silicon compounds such as organoalkoxysilanes and hexamethyldisilazane, and titanium compounds such as tetrabutyl titanate and hydrolysis-condensation products of these.

The surface treatment using the other surface treatment agent may be performed concurrently with the reaction between the amine compound and the particles of the polycondensate, or may be performed after the reaction.

The process of performing the surface treatment is not particularly limited as long as it causes the surfaces of the particles to be coated with the surface treatment agent. For example, the surface treatment can be performed in the following manner: the particles are placed into an appropriate container; subsequently the surface treatment agent is placed into the container; the particles and the surface treatment agent are then stirred and mixed at a temperature of room temperature (25° C.±5° C.) to about 100° C. for 3 to 24 hours, to thereby be brought into contact with each other. In this case, the surface treatment agent can be dissolved in a solvent such as methanol, and gradually added dropwise to perform the mixing and the contact, to thereby perform more uniformly the surface treatment. Note that the amount of surface treatment agent present in the surfaces of the particles can be adjusted by appropriately selecting, for example, the type of the surface treatment agent, the time for the surface treatment, and the particle size of the external additive. The resultant surface-treated product can be, as needed, subjected to a washing treatment using, for example, alcohol, to thereby obtain external additive particles from which unwanted substances have been removed.

Post-Treatment

The particles including the polymer obtained by the method for producing the external additive particles according to the present disclosure can be isolated from the slurry by a process such as filtration, centrifugation, concentration under a reduced pressure, spray-drying, or flash vacuum drying, and subsequently subjected to a drying treatment preferably at 30 to 100° C. The drying treatment is performed more preferably at 30 to 80° C., still more preferably at 50 to 70° C. The drying treatment can be performed, so that external additive particles that have appropriate charging properties and appropriate mechanical strength tend to be obtained.

Toner

The external additive particles according to the present disclosure can be contained in the surfaces of the toner particles. Specifically, an embodiment according to the present disclosure can be a toner containing toner particles and external additive particles in the surfaces of the toner particles, wherein the external additive particles are the external additive particles according to the present disclosure.

The toner particles can contain a binder resin. Examples of the binder resin include polyester-based resins, vinyl-based resins, epoxy resins, and polyurethane resins.

The binder resin can have, from the viewpoint of storage stability, a glass transition point (Tg) of 45 to 70° C.

Method for Producing Toner Particles

The method for producing the toner particles according to the present disclosure is not particularly limited, and examples include a pulverization process and polymerization processes such as an emulsion polymerization process, a suspension polymerization process, and a dissolution suspension process.

The pulverization process will be described. In the pulverization process, first, a binder resin, a coloring agent, a wax, a charge control agent, and the like for constituting the toner particles are sufficiently mixed with a mixer such as a Henschel mixer or a ball mill. Subsequently, the resultant mixture is melt-kneaded with a twin-screw kneader-extruder or a thermal kneader including a heating roll, a kneader, and an extruder, solidified by cooling, and subsequently pulverized and classified. This provides the toner particles according to the present disclosure.

Examples of such kneaders include the following: KRC Kneader (manufactured by Kurimoto, Ltd.); Buss Co-Kneader (manufactured by Buss AG); TEM Extruder (manufactured by Toshiba Machine Co., Ltd.); TEX twin-screw extruder (manufactured by The Japan Steel Works, Ltd.); PCM kneader (manufactured by Ikegai Ironworks Corp); a three roll mill, a mixing roll mill, a kneader (manufactured by INOUE MFG., INC.); KNEADEX (manufactured by MITSUI MINING COMPANY, LIMITED); MS TYPE PRESSURE KNEADER, KNEADER-RUDER (manufactured by Nihon Spindle Manufacturing Co., Ltd.); and Banbury mixer (manufactured by Kobe Steel, Ltd.).

Examples of the pulverizer include the following: Opposed Jet Mill, Micron Jet, INNOMIZER (manufactured by Hosokawa Micron Corporation); Model IDS MILL, PJM JET MILL (manufactured by Nippon Pneumatic Mfg. Co., Ltd.); Cross Jet Mill (manufactured by Kurimoto, Ltd.); ULMAX (manufactured by NISSO ENGINEERING CO., LTD.); SK Jet-O-Mill (manufactured by Seishin Enterprise Co., Ltd.); KRYPTRON (manufactured by Kawasaki Heavy Industries, Ltd.); Turbo Mill (manufactured by Turbo Kogyo Co., Ltd.); and Super Rotor (manufactured by NISSHIN ENGINEERING INC.).

Examples of the classifier include the following: Classiel, Micron Classifier, Spedic Classifier (manufactured by Seishin Enterprise Co., Ltd.); Turbo Classifier (manufactured by NISSHIN ENGINEERING INC.); Micron Separator, Turboplex (ATP), TSP Separator (manufactured by Hosokawa Micron Corporation); Elbow-jet (manufactured by Nittetsu Mining Co., Ltd.), Dispersion Separator (manufactured by Nippon Pneumatic Mfg. Co., Ltd.); and YM Micro Cut (manufactured by YASKAWA & CO., LTD.).

The suspension polymerization process will be described. In the suspension polymerization process, first, a polymerizable monomer for generating a binder resin and, as needed, various additives are mixed, and treated using a dispersing machine to prepare a polymerizable monomer composition in which the materials are dissolved or dispersed. Examples of the various additives include a coloring agent, a wax, a charge control agent, a polymerization initiator, and a chain transfer agent. Examples of the dispersing machine include a homogenizer, a ball mill, a colloid mill, and an ultrasonic dispersing machine. Subsequently, the polymerizable monomer composition is placed into an aqueous medium containing sparingly water-soluble inorganic fine particles, and treated using a high-speed dispersing machine such as a high-speed stirring machine or an ultrasonic dispersing machine, to prepare droplets of the polymerizable monomer composition (droplet formation step). Subsequently, the polymerizable monomer in the droplets is polymerized to obtain toner particles (polymerization step). The polymerization initiator may be mixed during preparation of the polymerizable monomer composition, or may be mixed with the polymerizable monomer composition immediately before formation of droplets in the aqueous medium. Alternatively, the polymerization initiator may be added during formation of the droplets or after completion of formation of the droplets, in other words, immediately before initiation of the polymerization reaction, as needed, in the form of being dissolved in the polymerizable monomer or another solvent. After the polymerizable monomer is polymerized to obtain a binder resin, as needed, a treatment of removing the solvent can be performed to obtain a dispersion liquid of toner particles.

Process of Externally Adding External Additive Particles to Toner Particles

The toner according to the present disclosure can be obtained by mixing toner particles and external additive particles in a mixer such as a Henschel mixer.

Examples of the mixer include the following: Henschel mixer (manufactured by MITSUI MINING COMPANY, LIMITED); super mixer (manufactured by KAWATA MFG. CO., LTD.); RIBOCONE (manufactured by OKAWARA MFG. CO., LTD.); NAUTA MIXER, TURBULIZER, Cyclomix (manufactured by Hosokawa Micron Corporation); Spiral Pin Mixer (manufactured by Pacific Machinery & Engineering Co., Ltd.); and Loedige Mixer (manufactured by MATSUBO Corporation).

The toner particles, which contain, in the surfaces, the above-described external additive particles, can further contain another external additive. Examples of the other external additive include the following.

Fluororesin powders such as a vinylidene fluoride fine powder and a polytetrafluoroethylene fine powder; silica fine powders such as wet process silica and dry process silica, fine powder titanium oxide, fine powder alumina, and treated silica provided by surface treatment of these using a silane compound, a titanium coupling agent, or silicone oil; oxides such as zinc oxide and tin oxide; double oxides such as strontium titanate, barium titanate, calcium titanate, strontium zirconate, and calcium zirconate; and carbonate compounds such as calcium carbonate and magnesium carbonate.

Various Additives for Toner

The toner may contain, as needed, one or more additives selected from a coloring agent, a wax, a magnetic material, and a charge control agent, for example. Specifically, various additives used for the toner will be described.

Magnetic Material

The toner may be provided so as to contain magnetic particles, and used as a magnetic toner. In this case, the magnetic particles may also have the role of a coloring agent.

Examples of the magnetic particles included in the magnetic toner include the following.

Iron oxides such as magnetite, hematite, and ferrite; metals such as iron, cobalt, and nickel; alloys of such a metal and a metal such as aluminum, cobalt, copper, lead, magnesium, tin, zinc, antimony, bismuth, calcium, manganese, titanium, tungsten, or vanadium, and mixtures of the foregoing.

The magnetic particles preferably have an average particle size of 2 µm or less, more preferably 0.05 µm or more and 0.5 µm or less. The content of the magnetic particles is preferably 20 parts by mass or more and 200 parts by mass or less relative to 100 parts by mass of the binder resin, more preferably 40 parts by mass or more and 150 parts by mass or less relative to 100 parts by mass of the binder resin.

Coloring Agent

Examples of the coloring agent include the following.

Examples of a black coloring agent include carbon black, grafted carbon, and coloring agents prepared using the following yellow/magenta/cyan coloring agents so as to have a black color.

Examples of a yellow coloring agent include compounds represented by condensed azo compounds, isoindolinone compounds, anthraquinone compounds, azo metal complexes, methine compounds, and arylamide compounds.

Examples of a magenta coloring agent include condensed azo compounds, diketopyrrolopyrrole compounds, anthraquinone, quinacridone compounds, basic dye lake compounds, naphthol compounds, benzimidazolone compounds, thioindigo compounds, and perylene compounds. Examples of a cyan coloring agent include copper phthalocyanine compounds and derivatives thereof, anthraquinone compounds, and basic dye lake compounds.

Such coloring agents can be used alone or in combination, or can be used in the form of solid solution. Such a coloring agent is selected in accordance with hue angle, saturation, lightness, weatherability, OHP transparency, and dispersibility in the toner.

The content of the coloring agent relative to 100 parts by mass of the binder resin can be 1 part by mass or more and 20 parts by mass or less.

Wax

Examples of the wax include the following.

Aliphatic hydrocarbon waxes such as low-molecular-weight polyethylene, low-molecular-weight polypropylene, polyolefin copolymers, polyolefin waxes, microcrystalline wax, paraffin wax, and Fischer-Tropsch wax; oxides of aliphatic hydrocarbon waxes such as oxidized polyethylene wax; block copolymers of aliphatic hydrocarbon waxes, and oxides thereof.

Ester waxes mainly containing fatty acid esters such as carnauba wax; and partially or completely deacidified fatty acid esters such as deacidified carnauba wax.

Charge Control Agent

The charge control agent is not particularly limited, and can be an organic metal complex or a chelate compound. Examples include monoazo metal complexes; acetylacetone metal complexes; and metal complexes or metal salts of aromatic hydroxycarboxylic acids or aromatic dicarboxylic acids.

Specific examples of the agent usable include Spilon Black TRH, T-77, T-95 (Hodogaya Chemical Co., LTD.), and BONTRON (registered trademark) S-34, S-44, S-54, E-84, E-88, E-89 (ORIENT CHEMICAL INDUSTRIES CO., LTD.). In addition, a charge control resin may also be used in combination with the charge control agent.

Developer

The toner may be used as a one-component developer or, from the viewpoint of further improving dot reproducibility or providing stable images for a long term, may be mixed with a magnetic carrier and used as a two-component developer.

Examples of the magnetic carrier include surface-oxidized iron, surface-unoxidized iron, metals such as nickel, cobalt, manganese, chromium, and rare-earth metals, alloys and oxides of the foregoing.

The surfaces of the magnetic carrier can contain or be coated with a styrene-based resin, an acrylic resin, a silicone-based resin, a fluororesin, or polyester.

Various Measurement Methods Etc.

Hereinafter, various measurement methods etc. will be described. Measurement method of ratio of number of silicon atoms to total number of carbon atoms, oxygen atoms, and silicon atoms constituting external additive particles, and content ratio of carbon atoms and silicon atoms constituting external additive particles Carbon atoms and oxygen atoms In the external additive particles, the concentrations (atomic %) of carbon atoms and oxygen atoms are calculated by elemental analysis using combustion. The apparatus for the elemental analysis is as follows.

Apparatus used: manufactured by PerkinElmer, Inc., 240011, fully automatic elemental analyzer Silicon Atoms In the external additive particles, the concentration (atomic %) of silicon atoms is measured by elemental analysis using inductively coupled plasma-atomic emission spectroscopy (ICP-AES) using alkali fusion. The apparatus for ICP-AES is as follows.

Apparatus used: manufactured by SHIMADZU CORPORATION, ICPS-8100

The obtained composition ratios are converted into mol %, and the converted values are used to calculate, relative to the total number of carbon atoms, oxygen atoms, and silicon atoms constituting the external additive particles, the ratio of the number of the silicon atoms. Similarly, relative to the number of silicon atoms constituting the external additive particles, the ratio of the number of the carbon atoms is calculated.

Measurement Method of Ratios of Numbers of Sulfur Atoms and Nitrogen Atoms to Total Number of Carbon Atoms, Nitrogen Atoms, Oxygen Atoms, Silicon Atoms, and Sulfur Atoms in Surfaces of External Additive Particles The ratios of the numbers of sulfur atoms and nitrogen atoms in the surface regions of the external additive particles are measured by analysis using X-ray photoelectron spectroscopy. The apparatus and measurement conditions are as follows.

Apparatus used: PHI Quantera SXM manufactured by ULVAC-PHI, Inc.

X-ray photoelectron spectrometer measurement conditions:

X-ray source: Al Kα (1486.6 eV) 200 μmϕ

Pass Energy: 140 eV

Charge neutralization: electron neutralization gun and Ar ion neutralization gun used in combination Number of sweeps: 20 times for C, 100 times for N, 20 times for O, 20 times for Si, 100 times for S From the measured peak intensities of the elements, calculations were performed using relative sensitivity factors provided by ULVAC-PHI, Inc. to determine the atomic concentrations (all in atomic %) of carbon atoms, nitrogen atoms, oxygen atoms, silicon atoms, and sulfur atoms in the surface regions of the external additive particles. From the results, relative to the total number of carbon atoms, nitrogen atoms, oxygen atoms, silicon atoms, and sulfur atoms in the surfaces of the external additive particles, the ratios of the numbers of the nitrogen atoms and the sulfur atoms are calculated. Similarly, relative to the number of the sulfur atoms in the surface regions of the external additive particles, the ratio of the number of the nitrogen atoms is calculated. Measurement method of particle size of fine particle sample at 50% of volume-based distribution (D50)

A particle size of a fine particle sample at 50% of the volume-based distribution (D50) is measured using a dynamic light scattering particle size analyzer Nanotrac UPA-EX150 (manufactured by NIKKISO CO., LTD.). Specifically, the range is set to 0.001 μm to 10 μm, and the measurement is performed in the following manner.

In order to prevent aggregation of the measurement sample, into an aqueous solution containing Family Fresh (manufactured by Kao Corporation), a dispersion liquid in which the measurement sample is dispersed is placed and stirred. After stirring, the measurement sample is injected into the above-described apparatus. The measurement is performed twice and the measured values are averaged.

The measurement conditions are as follows: the measurement time is set to 30 seconds; the sample particles have a refractive index of 1.49; as the dispersion medium, water is employed; and the dispersion medium has a refractive index of 1.33. The volume-based particle size distribution of the measurement sample is measured; on the basis of the measurement result, a particle size at a cumulative volume of 50% in the volume-based cumulative distribution drawn from the smaller particle sizes is defined as the particle size at 50% (D50) of the volume-based distribution of fine particles.

Examination of the Presence of Vinyl Polymer Moiety and Siloxane Moiety in Polymer, and $^{29}$Si-NMR Measurement The presence of the vinyl polymer moiety in the polymer can be examined by subjecting the polymer to pyrolysis GC/MS, to identify the monomer species generated by pyrolysis. In the present disclosure, as an apparatus of pyrolysis GC/MS for examining the presence of the vinyl polymer moiety in the polymer, the following apparatuses were used in combination.

Agilent 7890A, 5975C (Agilent Technologies)
PY-2020iD (Frontier Laboratories Ltd.)

Together with pyrolysis GC/MS, solid-state NMR analysis and IR analysis can also be performed. The presence of the siloxane moiety in the polymer can be confirmed by detection of, in $^{29}$Si-NMR measurement (solid-state NMR) for the polymer, at least any one of Unit Q, Unit T, Unit D, and Unit M. In the present disclosure, as an apparatus of solid-state NMR for examination of the presence of the siloxane moiety in the polymer, Avance III (manufactured by Bruker Corporation) was used. In the $^{29}$Si-NMR measurement (solid-state NMR), the presence of Unit Q results in the appearance of a peak in −105 ppm to −118 ppm in the spectrum; the presence of Unit T results in the appearance of a peak in −40 ppm to −74 ppm or −94 ppm to −104 ppm; the presence of Unit D results in the appearance of a peak in −13 ppm to −25 ppm; the presence of Unit M results in the appearance of a peak at or near 8.5 ppm. These peaks are identified and the integral values of the peaks are calculated, which are the integral values in Formula (P1) above. For peaks corresponding to Unit T, Unit T0 results in the appearance of a peak in −40 ppm to −45 ppm, Unit T1 results in the appearance of a peak in −45 ppm to −53 ppm, Unit T2 results in the appearance of a peak in −53 ppm to −64 ppm, and Unit T3 results in the appearance of a peak in −64 ppm to −74 ppm. The peaks of Units T0 to T3 are separated using peak fitting program "SOLA-Solid LineShape Analysis" bundled with NMR analysis software TopSpin 3.5 manufactured by Bruker Corporation. The separation is performed with the following parameters; the integral values and ratios of the peaks are calculated, to thereby determine values of Formulas (P2) and (P3) above.

Analysis range: 40 to −140 ppm
Model function: Gaussian function
Initial peak positions: T3 at or near −70 ppm, T2 at or near −60 ppm, T1 at or near −50 ppm, T0 at or near −40 ppm, M at or near 10 ppm

EXAMPLES

Hereinafter, the present disclosure will be described in detail with reference to Examples; however, the present disclosure is not limited to these Examples. Note that "parts" and "%" respectively mean "parts by mass" and "mass %" unless otherwise specified. In EXAMPLES, the measurement results are results measured by the above-described measurement methods.

Production Example of External Additive 1

Into a glass reaction vessel equipped with a thermometer, a reflux condenser, a nitrogen gas inlet, and a stirrer, the following materials were placed.

Phosphate buffer solution (pH=7.0, prepared using sodium dihydrogen phosphate dihydrate (manufactured by KISHIDA CHEMICAL Co., Ltd.) and disodium hydrogenphosphate dodecahydrate (manufactured by KISHIDA CHEMICAL Co., Ltd.)): 200 parts Sulfur atom source: sodium p-styrenesulfonate (manufactured by KISHIDA CHEMICAL Co., Ltd.): 0.13 parts Monomer including radical-polymerizable group and hydrolyzable group: 3-(trimethoxysilyl)propyl methacrylate (manufactured by Tokyo Chemical Industry Co., Ltd.): 11.0 parts Nonhydrolyzable monomer: styrene (manufactured by Tokyo Chemical Industry Co., Ltd.): 4.7 parts Subsequently, under a stream of nitrogen gas, the materials were heated at 65 to 70° C., stirred for 30 minutes, subsequently mixed with, as an initiator, 0.51 parts of potassium peroxodisulfate (manufactured by KISHIDA CHEMICAL Co., Ltd.), and continuously stirred for 6 hours, to obtain an emulsion of particles. The obtained emulsion of particles was subjected to an ammonia treatment by adding 28 mass % aqueous ammonia (manufactured by KISHIDA CHEMICAL Co., Ltd.) to adjust the pH of the emulsion to 11.0, and subsequently stirred at a temperature of 50° C. for 3 hours, to perform hydrolysis and polycondensation of hydrolyzable groups included in the particles. Subsequently, in order to remove an excess of the solute, ultrafiltration was performed, and concentration/filtration was repeated five times in total. Subsequently, as a nitrogen atom source, 0.13 parts of 3-aminopropyltrimethoxysilane (manufactured by Tokyo Chemical Industry Co., Ltd.) and, as a hydrophobic treatment agent, 27.0 parts of 1,1,1,3,3,3-hexamethyldisilazane (manufactured by KISHIDA CHEMICAL Co., Ltd.) were added, and stirring was performed at a temperature of 50° C. for 24 hours. Subsequently, drying was performed by spray-drying to obtain polymer particles having a particle size at 50% of the volume-based distribution (hereafter, referred to as D50) of 130 nm as External additive 1. The obtained External additive particles 1 were subjected to $^{29}$Si-NMR measurement and pyrolysis GC/MS and, as a result, the presence of a vinyl polymer moiety and a siloxane moiety was confirmed. Properties of External additive 1 will be described in Table 2.

Production Examples of External Additives 2 to 16, 22, and 23

The same procedures as in Production Example of External additive 1 were performed except that the types and amounts of materials used were changed as described in Table 1, to obtain External additives 2 to 16, 22, and 23. The obtained External additive particles 2 to 16, 22, and 23 were subjected to $^{29}$Si-NMR measurement and pyrolysis GC/MS and, as a result, the presence of a vinyl polymer moiety and a siloxane moiety was confirmed. Properties of External additives 2 to 16, 22, and 23 will be described in Table 2.

Production Example of External Additive 17

The same procedures as in Production Example of External additive 1 were performed except that the procedure of adding 28 mass % aqueous ammonia so as to adjust the pH of the emulsion to 11.0 was replaced by a procedure of adding acetic acid (manufactured by KISHIDA CHEMICAL Co., Ltd.) so as to adjust the pH of the emulsion to 3.0, to obtain External additive 17. The obtained External additive particles 17 were subjected to $^{29}$Si-NMR measurement and pyrolysis GC/MS and, as a result, the presence of a vinyl polymer moiety and a siloxane moiety was confirmed. Properties of External additive 17 will be described in Table 2.

Production Example of External Additive 18

The same procedures as in Production Example of External additive 1 were performed except that the procedure of adding 28 mass % aqueous ammonia so as to adjust the pH of the emulsion to 11.0 was replaced by a procedure of adding hydrochloric acid (manufactured by KISHIDA CHEMICAL Co., Ltd.) so as to adjust the pH of the emulsion to 3.0, to obtain External additive 18. The obtained External additive particles 18 were subjected to $^{29}$Si-NMR measurement and pyrolysis GC/MS and, as a result, the presence of a vinyl polymer moiety and a siloxane moiety was confirmed. Properties of External additive 18 will be described in Table 2.

Production Example of External Additive 19

The same procedures as in Production Example of External additive 1 were performed except that the procedure of adding aqueous ammonia so as to adjust the pH to 11.0 and subsequently performing stirring at a temperature of 50° C. for 3 hours was replaced by a procedure of adding hydrochloric acid so as to adjust the pH to 3.0 and subsequently performing stirring at a temperature of 50° C. for 1 hour, to obtain External additive 19. The obtained External additive particles 19 were subjected to $^{29}$Si-NMR measurement and pyrolysis GC/MS and, as a result, the presence of a vinyl polymer moiety and a siloxane moiety was confirmed. Properties of External additive 19 will be described in Table 2.

Production Example of External Additive 20

At room temperature, to a solution mixture of 46.7 parts of 28 mass % aqueous ammonia and 2114 parts of deionized water, a solution mixture of the following materials was added, and stirring was performed for 2 hours to perform hydrolysis and polycondensation of 3-(trimethoxysilyl)propyl methacrylate.
　3-(Trimethoxysilyl)propyl methacrylate: 22.1 parts
　Methanol (manufactured by KISHIDA CHEMICAL Co., Ltd.): 73.7 parts
　Initiator: 2,2'-azobis(2,4-dimethylvaleronitrile) (V-65, manufactured by FUJIFILM Wako Pure Chemical Corporation): 0.12 parts Subsequently, under a stream of nitrogen gas, the solution was heated at 70 to 75° C. and stirred for 2 hours to perform radical polymerization. Subsequently, in order to remove an excess of the solute, ultrafiltration was performed, and concentration/filtration was repeated five times in total. Subsequently, 0.22 parts of 3-aminopropyltrimethoxysilane (manufactured by Tokyo Chemical Industry Co., Ltd.) and, as a hydrophobic treatment agent, 27.0 parts of 1,1,1,3,3,3-hexamethyldisilazane (manufactured by KISHIDA CHEMICAL Co., Ltd.) were added, and stirring was performed at a temperature of 50° C. for 24 hours. Subsequently, drying was performed by spray-drying, to obtain polymer particles as External additive 20. The obtained External additive particles 20 were subjected to $^{29}$Si-NMR measurement and pyrolysis GC/MS and, as a result, the presence of a vinyl polymer moiety and a siloxane moiety was confirmed. Properties of External additive 20 will be described in Table 2.

Production Example of External Additive 21

The same procedures as in Production Example of External additive 1 were performed except that the types and amounts of materials used were changed as described in Table 1 and, concurrently with addition of the nitrogen atom source and the hydrophobic treatment agent, 0.1 parts of (3-mercaptopropyl)trimethoxysilane was added, to obtain External additive 21. The obtained External additive particles 21 were subjected to $^{29}$Si-NMR measurement and pyrolysis GC/MS and, as a result, the presence of a vinyl polymer moiety and a siloxane moiety was confirmed. Properties of External additive 21 will be described in Table 2.

Production Example of External Additive 24

Into a glass reaction vessel equipped with a thermometer, a reflux condenser, a nitrogen gas inlet, and a stirrer, the following materials were placed.
　Deionized water: 200 parts
　Sulfur atom source: sodium p-styrenesulfonate: 0.13 parts
　Nonhydrolyzable monomer: 6.3 parts of butyl methacrylate (manufactured by Tokyo Chemical Industry Co., Ltd.) and 4.7 parts of styrene Subsequently, under a stream of nitrogen gas, heating at 65 to 70° C. was performed and stirring was performed for 30 minutes; subsequently, as an initiator, 0.51 parts of potassium peroxodisulfate was added and stirring was continuously performed for 6 hours to obtain an emulsion of particles. In the obtained emulsion, in order to remove an excess of the solute, ultrafiltration was performed and concentration/filtration was repeated five times in total. Subsequently, as a nitrogen atom source, 0.13 parts of 3-aminopropyltrimethoxysilane (manufactured by Tokyo Chemical Industry Co., Ltd.) and, as a hydrophobic treatment agent, 27.0 parts of 1,1,1,3,3,3-hexamethyldisilazane (manufactured by KISHIDA CHEMICAL Co., Ltd.) were added, and stirring was performed at a temperature of 50° C. for 24 hours. Subsequently, drying was performed by spray-drying, to obtain External additive 24. Properties of External additive 24 will be described in Table 2.

TABLE 1

| Additive Type | Monomer including radical-polymerizable group and hydrolyzable group | | Nonhydrolyzable monomer | | Sulfur atom source | |
|---|---|---|---|---|---|---|
| | Type | Parts | Type | Parts | Type | Parts |
| 1 | MA-TMSP | 11.0 | St | 4.7 | p-StSO$_3$Na | 0.13 |
| 2 | MA-TMSP | 11.0 | St | 4.7 | p-StSO$_3$Na | 0.13 |
| 3 | MA-TMSP | 11.0 | St | 4.7 | p-StSO$_3$Na | 0.13 |
| 4 | MA-TMSP | 22.1 | — | — | p-StSO$_3$Na | 0.13 |
| 5 | MA-TESP | 13.0 | St | 4.7 | p-StSO$_3$Na | 0.13 |
| 6 | MA-TESP | 25.8 | — | — | p-StSO$_3$Na | 0.13 |
| 7 | AA-TMSP | 10.4 | St | 4.7 | p-StSO$_3$Na | 0.13 |
| 8 | MA-TMSP | 11.0 | St | 4.7 | Na dodecyl sulfate | 0.18 |
| 9 | MA-TMSP | 11.0 | St | 4.7 | DSS | 0.28 |
| 10 | MA-TMSP | 11.0 | St | 4.7 | p-StSO$_3$Na | 0.63 |

TABLE 1-continued

| | | | | | | |
|---|---|---|---|---|---|---|
| 11 | MA-TMSP | 11.0 | St | 4.7 | p-StSO₃Na | 0.06 |
| 12 | MA-TMSP | 11.0 | St | 4.7 | p-StSO₃Na | 0.76 |
| 13 | MA-TMSP | 11.0 | St | 4.7 | p-StSO₃Na | 0.76 |
| 14 | MA-TMSP | 11.0 | St | 4.7 | p-StSO₃Na | 0.76 |
| 15 | AA-TMSP | 20.8 | — | — | p-StSO₃Na | 0.76 |
| 16 | VTMS | 13.2 | — | — | p-StSO₃Na | 0.76 |
| 17 | MA-TMSP | 11.0 | St | 4.7 | p-StSO₃Na | 0.13 |
| 18 | MA-TMSP | 11.0 | St | 4.7 | p-StSO₃Na | 0.13 |
| 19 | MA-TMSP | 11.0 | St | 4.7 | p-StSO₃Na | 0.13 |
| 20 | MA-TMSP | 22.1 | — | — | — | — |
| 21 | MA-TMSP | 11.0 | St | 4.7 | p-StSO₃Na | 0.13 |
| 22 | MA-TMSP | 11.0 | St | 4.7 | p-StSO₃Na | 0.13 |
| 23 | MA-TMSP | 8.0 | St | 6.0 | p-StSO₃Na | 0.13 |
| 24 | — | — | StMAB | 4.7 / 6.3 | p-StSO₃Na | 0.13 |

| Additive Type | Nitrogen atom source Type | Parts | Radical polymerization initiator Type | Parts | Condensation catalyst | Condensation time |
|---|---|---|---|---|---|---|
| 1 | AP-TMS | 0.13 | KPS | 0.51 | NH3 | 3 h |
| 2 | AMA-TMS | 0.13 | KPS | 0.51 | NH3 | 3 h |
| 3 | AMA-PDMMS | 0.13 | KPS | 0.51 | NH3 | 3 h |
| 4 | AP-TMS | 0.13 | KPS | 0.51 | NH3 | 3 h |
| 5 | AP-TMS | 0.13 | KPS | 0.51 | NH3 | 3 h |
| 6 | AP-TMS | 0.13 | KPS | 0.51 | NH3 | 3 h |
| 7 | AP-TMS | 0.13 | KPS | 0.51 | NH3 | 3 h |
| 8 | AP-TMS | 0.13 | KPS | 0.51 | NH3 | 3 h |
| 9 | AP-TMS | 0.13 | KPS | 0.51 | NH3 | 3 h |
| 10 | AP-TMS | 0.13 | KPS | 0.51 | NH3 | 3 h |
| 11 | AP-TMS | 0.13 | KPS | 0.51 | NH3 | 3 h |
| 12 | AP-TMS | 0.13 | KPS | 0.51 | NH3 | 3 h |
| 13 | DMAP-TMS | 0.13 | KPS | 0.51 | NH3 | 3 h |
| 14 | IP-TMS | 0.13 | KPS | 0.51 | NH3 | 3 h |
| 15 | IP-TMS | 0.13 | KPS | 0.51 | NH3 | 3 h |
| 16 | IP-TMS | 0.13 | KPS | 0.51 | NH3 | 3 h |
| 17 | AP-TMS | 0.13 | KPS | 0.51 | AcOH | 3 h |
| 18 | AP-TMS | 0.13 | KPS | 0.51 | HCl | 3 h |
| 19 | AP-TMS | 0.13 | KPS | 0.51 | HCl | 1 h |
| 20 | AP-TMS | 0.22 | V-65 | 0.12 | NH3 | 3 h |
| 21 | AP-TMS | 0.13 | KPS | 0.51 | NH3 | 3 h |
| 22 | AP-TMS | 0.63 | KPS | 0.51 | NH3 | 3 h |
| 23 | AP-TMS | 0.13 | KPS | 0.51 | NH3 | 3 h |
| 24 | AP-TMS | 0.13 | KPS | 0.51 | NH3 | 3 h |

The abbreviations in Table 1 are as follows.
MA-TMSP: 3-(trimethoxysilyl)propyl methacrylate
MA-TESP: 3-(triethoxysilyl)propyl methacrylate
AA-TMSP: 3-(trimethoxysilyl)propyl acrylate
VTMS: vinyltrimethoxysilane
MAB: butyl methacrylate
St: styrene
DSS: sodium bis(2-ethylhexyl) sulfosuccinate
AP-TMS: 3-aminopropyltrimethoxysilane
AMA-TMS: 3-(2-aminoethylamino)propyltrimethoxysilane
AMA-PDMMS: 3-(2-aminoethylamino)propyldimethoxymethylsilane
DMAP-TMS: [3-(N,N-dimethylamino)propyl]trimethoxysilane
IP-TMS: (3-isocyanatopropyl)trimethoxysilane
KPS: potassium peroxodisulfate
V-65: 2,2'-azobis(2,4-dimethylvaleronitrile)

TABLE 2

| | Si/(C + O + Si) | N/(C + N + O + Si + S) | S/(C + N + O + Si + S) | C/Si | N/S | D50(nm) | T/(M + D + T + Q) | (T0 + T1)/(T0 + T1 + T2 + T3) | T2/(T0 + T1 + T2 + T3) | T2/T3 |
|---|---|---|---|---|---|---|---|---|---|---|
| Additive 1 | 5.1% | 1.50% | 0.18% | 15.0 | 8.3 | 130 | 92% | 0.21 | 0.23 | 0.41 |
| Additive 2 | 5.1% | 1.70% | 0.18% | 15.0 | 9.4 | 130 | 92% | 0.21 | 0.26 | 0.49 |
| Additive 3 | 5.1% | 1.60% | 0.18% | 15.0 | 8.9 | 130 | 94% | 0.21 | 0.27 | 0.52 |
| Additive 4 | 8.7% | 1.40% | 0.18% | 7.0 | 7.8 | 125 | 90% | 0.11 | 0.14 | 0.19 |
| Additive 5 | 5.1% | 1.50% | 0.17% | 15.0 | 8.8 | 145 | 93% | 0.39 | 0.09 | 0.17 |
| Additive 6 | 8.7% | 1.40% | 0.17% | 7.0 | 8.2 | 122 | 95% | 0.30 | 0.05 | 0.08 |
| Additive 7 | 5.4% | 1.30% | 0.17% | 14.0 | 7.6 | 89 | 91% | 0.21 | 0.25 | 0.46 |
| Additive 8 | 5.1% | 1.50% | 0.08% | 15.0 | 18.8 | 70 | 91% | 0.27 | 0.27 | 0.59 |
| Additive 9 | 5.1% | 1.50% | 0.07% | 15.0 | 21.4 | 68 | 90% | 0.27 | 0.32 | 0.78 |
| Additive 10 | 5.1% | 0.50% | 0.23% | 15.0 | 2.2 | 48 | 96% | 0.11 | 0.33 | 0.59 |

TABLE 2-continued

| | Si/(C + O + Si) | N/(C + N + O + Si + S) | S/(C + N + O + Si + S) | C/Si | N/S | D50(nm) | T/(M + D + T + Q) | (T0 + T1)/(T0 + T1 + T2 + T3) | T2/(T0 + T1 + T2 + T3) | T2/T3 |
|---|---|---|---|---|---|---|---|---|---|---|
| Additive 11 | 5.1% | 1.50% | 0.08% | 15.0 | 18.8 | 210 | 94% | 0.48 | 0.18 | 0.53 |
| Additive 12 | 5.1% | 0.50% | 0.24% | 15.0 | 2.1 | 46 | 95% | 0.14 | 0.32 | 0.59 |
| Additive 13 | 5.1% | 0.50% | 0.24% | 15.0 | 2.1 | 47 | 92% | 0.14 | 0.31 | 0.56 |
| Additive 14 | 5.1% | 0.40% | 0.24% | 15.0 | 1.7 | 45 | 93% | 0.15 | 0.28 | 0.49 |
| Additive 15 | 9.5% | 0.40% | 0.24% | 6.0 | 1.7 | 47 | 92% | 0.11 | 0.19 | 0.27 |
| Additive 16 | 22.2% | 0.40% | 0.24% | 2.0 | 1.7 | 46 | 91% | 0.11 | 0.21 | 0.31 |
| Additive 17 | 5.1% | 1.50% | 0.18% | 15.0 | 8.3 | 132 | 98% | 0.00 | 0.70 | 2.33 |
| Additive 18 | 5.1% | 1.50% | 0.18% | 15.0 | 8.3 | 130 | 96% | 0.06 | 0.45 | 0.92 |
| Additive 19 | 5.1% | 1.50% | 0.18% | 15.0 | 8.3 | 136 | 97% | 0.09 | 0.30 | 0.49 |
| Additive 20 | 8.7% | 1.70% | 0.00% | 7.0 | — | 120 | 90% | 0.11 | 0.05 | 0.06 |
| Additive 21 | 5.1% | 1.50% | 0.27% | 15.0 | 5.6 | 133 | 92% | 0.22 | 0.21 | 0.37 |
| Additive 22 | 5.1% | 2.70% | 0.18% | 15.0 | 15 | 129 | 90% | 0.23 | 0.25 | 0.48 |
| Additive 23 | 3.9% | 1.50% | 0.18% | 21.2 | 8.3 | 115 | 94% | 0.54 | 0.26 | 1.30 |
| Additive 24 | — | 1.50% | 0.18% | — | 8.3 | 110 | — | — | — | — |

In Table 2, N/(C+N+O+Si+S) is, in the surfaces of the external additive particles analyzed by X-ray photoelectron spectroscopy, relative to the total number of carbon atoms, nitrogen atoms, oxygen atoms, silicon atoms, and sulfur atoms, the ratio of the number of the nitrogen atoms. S/(C+N+O+Si+S) is, in the surfaces of the external additive particles analyzed by X-ray photoelectron spectroscopy, relative to the total number of carbon atoms, nitrogen atoms, oxygen atoms, silicon atoms, and sulfur atoms, the ratio of the number of the sulfur atoms. N/S is, in the surfaces of the external additive particles analyzed by X-ray photoelectron spectroscopy, relative to the number of sulfur atoms, the ratio of the number of nitrogen atoms. Si/(C+O+Si) is, relative to the total number of carbon atoms, oxygen atoms, and silicon atoms constituting the external additive particles, the ratio of the number of the silicon atoms. C/Si is, relative to the number of silicon atoms constituting the external additive particles, the ratio of the number of carbon atoms. T/(M+D+T+Q) is the value of Formula (P1) according to the present disclosure. (T0+T1)/(T0+T1+T2+T3) is the value of Formula (P2) according to the present disclosure. T2/(T0+T1+T2+T3) is the value of Formula (P3) according to the present disclosure. T2/T3 is, in the external additive particles subjected to $^{29}$Si-NMR measurement, the ratio of the integral value of Unit T2 to the integral value of Unit T3. The present inventors infer the following: the sulfur atom sources used in Production Examples of External additives 8 and 9 do not bond to the polymers in the external additive particles, and hence are washed off, during ultrafiltration, from the surfaces of the external additive particles. However, potassium peroxodisulfate used as the polymerization initiator introduces, into the polymers in the external additive particles, —OSO$_3$K or —OSO$_3$H, so that sulfur atoms are detected in the surfaces of the external additive particles, which is inferred by the present inventors.

Production Example of Toner Particles 1

The following materials were premixed using a Henschel mixer, and subsequently melt-kneaded using a twin-screw extruder (trade name: PCM-30, manufactured by Ikegai Ironworks Corp) set at such a temperature that the molten material at the extrusion port was at 150° C., to obtain a kneaded product.

Amorphous polyester (propylene oxide adduct of bisphenol A/terephthalic acid=50/50, number-average molecular weight: 3000, acid value: 12): 100 parts Magnetic iron oxide particles: 75 parts
Fischer-Tropsch wax (C105 manufactured by Sasol Limited, melting point: 105° C.): 2 parts
Charge control agent (manufactured by Hodogaya Chemical Co., LTD., T-77): 2 parts The obtained kneaded product was cooled, roughly disintegrated in a hammer mill, and subsequently finely pulverized in a mill (trade name: Turbo Mill T250, manufactured by Turbo Kogyo Co., Ltd.), to obtain a finely pulverized powder. The obtained finely pulverized powder was classified with a multi-division classifier using a Coanda effect, to obtain Toner particles 1 having a weight-average particle size of 7.2 µm.

Production Example of Toner 1

To Toner particles 1, an external additive was externally added by a dry process. Into a Henschel mixer, 100 parts of the toner particles, 1.3 parts of External additive 1, and 1.5 parts of fumed silica (BET specific surface area: 200 m$^2$/g) were added, and external addition and mixing was performed. Subsequently, the resultant mixture was sifted through a mesh having an aperture size of 150 µm, to obtain Toner 1 in which External additive 1 was externally added to Toner particles 1.

Production Examples of Toners 2 to 24

The same procedures as in Production Example of Toner 1 were performed except that the external additive externally added to Toner particles 1 was changed to External additives 2 to 24, to obtain Toners 2 to 24.

Example 1

Toner 1 was subjected to the following evaluations.
Evaluation of Flowability of Toner
The flowability of the toner was measured in the following manner.
First, a Powder Tester (PT-X, manufactured by Hosokawa Micron Corporation) was used such that, with sieves having an aperture size of 150 µm, 100 µm, or 45 µm (plain-weave metal sieves, standard: JIS Z8801-1) and being vibrated under a condition of an intensity of 4.0, 3 g of Toner 1 was sifted through these sieves for 10 seconds. The remaining amount of toner over the sieve having an aperture size of 150 µm was defined as A; the remaining amount of toner over the sieve having an aperture size of 100 µm was defined as B; the remaining amount of toner over the sieve having an aperture size of 45 µm was defined as C; flowability index (%) represented by a formula below was used to evaluate the flowability of the toner. The evaluation results will be described in Table 3. In the evaluation, the smaller the value of the flowability index, the higher the flowability of the toner.

Flowability index (%) =

$$[(A + 0.6 \times B + 0.2 \times C)/\text{mass of measurement sample}] \times 100$$

Evaluation of flowability retention of toner

The flowability retention of the toner was evaluated after the above-described evaluation.

As an image-forming apparatus, HP LaserJet Enterprise M609dn (manufactured by Hewlett-Packard Company) was used; the cartridge was charged with Toner 1 and 5000 images were output under the following conditions.

Paper: GFC-081 (81.0 g/m²) (Canon Marketing Japan Inc.)
Toner mass per unit area on paper: 0.35 mg/cm²
Process speed: 377 mm/s Subsequently, the residual toner within the cartridge was taken out; for the residual toner, the above-described flowability index was calculated and the resultant value was defined as the post-durability-test flowability index. In Evaluation of flowability of toner above, the determined flowability index was defined as the pre-durability-test flowability index. A change ratio represented by the following formula was calculated, and the resultant value was used for evaluating the flowability retention of the toner.

Change ratio (%) =

$$(\text{Post–durability–test flowability index} - \text{Pre–durability–test flowability index}) / \text{Pre–durability–test flowability index} \times 100$$

Toners having a change ratio of 100% or less were evaluated as exerting advantages according to the present disclosure.

Evaluation of Breakage of External Additive Particles and Separation of External Additive Particles from Toner Particles Breakage of the external additive particles and separation of the external additive particles from the toner particles were evaluated after the above-described evaluation of flowability retention of the toner.

After the output of 5000 images, Toner 1 remaining within the cartridge was taken out; the surfaces of Toner 1 taken out were observed using a scanning electron microscope (S-4800, manufactured by Hitachi High-Technologies Corporation), and captured to provide a SEM image. In the obtained captured image, a case where broken materials adhering to the surfaces of the toner were observed was evaluated as, for breakage, Occurred; a case where recesses formed by separation of external additive particles were observed in the surfaces of the toner was evaluated as, for separation, Occurred.

Evaluation of Image Density Stability

The image-forming apparatus used in the evaluation of flowability retention of the toner was used; the cartridge was charged with Toner 1, and 10000 images were output under the following conditions.

Under normal-temperature, low-humidity environment (temperature: 23° C., relative humidity: 5% RH)
Paper: GFC-081 (81.0 g/m²) (Canon Marketing Japan Inc.)
Toner mass per unit area on paper: 0.35 mg/cm²
Process speed: 377 mm/s During continuous output of 10000 images, calibration was stopped, so that the above-described conditions were not changed. The reflection densities of all the output images were measured and the standard deviation thereof was used for evaluation of image density stability. A case where the standard deviation was less than 0.100 was evaluated as exerting advantages according to the present disclosure. The reflection densities of the images were measured using an X-Rite color reflection densitometer (500 series: manufactured by X-Rite Inc.). Subsequently, 10000 images were further output, so that 20000 images in total were output; subsequently, image density stability was evaluated as above. In addition, after the output of the images, Toner 1 remaining within the cartridge was taken out; the surfaces of Toner 1 taken out were observed with the above-described scanning electron microscope and a SEM image was captured. The obtained captured image was examined as to whether or not the external additive produced above sank in the toner particles. The results will be described in Table 3.

Examples 2 to 19 and Comparative Examples 1 to 5

Toners 2 to 24 were evaluated as in Example 1. The evaluation results will be described in Table 3.

TABLE 3

| | | Output of 10000 images | | | SEM observation |
|---|---|---|---|---|---|
| | | Flowability index (%) | | | |
| | Additive | Pre-durability-test | Post-durability-test | Change ratio | Breakage |
| Example 1 | Additive 1 | 9 | 10 | 11% | None |
| Example 2 | Additive 2 | 9 | 10 | 11% | None |
| Example 3 | Additive 3 | 9 | 10 | 11% | None |
| Example 4 | Additive 4 | 12 | 14 | 17% | None |
| Example 5 | Additive 5 | 13 | 15 | 15% | None |
| Example 6 | Additive 6 | 13 | 15 | 15% | None |
| Example 7 | Additive 7 | 11 | 13 | 18% | None |
| Example 8 | Additive 8 | 12 | 15 | 25% | None |
| Example 9 | Additive 9 | 12 | 15 | 25% | None |
| Example 10 | Additive 10 | 12 | 16 | 33% | None |
| Example 11 | Additive 11 | 12 | 16 | 33% | None |
| Example 12 | Additive 12 | 15 | 21 | 40% | None |
| Example 13 | Additive 13 | 15 | 22 | 47% | None |

TABLE 3-continued

| | | | | | |
|---|---|---|---|---|---|
| Example 14 | Additive 14 | 15 | 23 | 53% | None |
| Example 15 | Additive 15 | 16 | 25 | 56% | None |
| Example 16 | Additive 16 | 16 | 28 | 75% | None |
| Example 17 | Additive 17 | 9 | 10 | 11% | None |
| Example 18 | Additive 18 | 9 | 10 | 11% | None |
| Example 19 | Additive 19 | 9 | 10 | 11% | None |
| Comparative Example 1 | Additive 20 | 46 | 98 | 113% | None |
| Comparative Example 2 | Additive 21 | 36 | 73 | 103% | None |
| Comparative Example 3 | Additive 22 | 40 | 82 | 105% | None |
| Comparative Example 4 | Additive 23 | 45 | 93 | 107% | Occurred |
| Comparative Example 5 | Additive 24 | 36 | 94 | 161% | Occurred |

| | Output of 10000 images | | Output of 20000 images | |
|---|---|---|---|---|
| | SEM observation Separation | Image density stability Standard deviation | Image density stability Standard deviation | SEM observation Sinking |
| Example 1 | None | 0.008 | 0.010 | Occurred |
| Example 2 | None | 0.010 | 0.013 | Occurred |
| Example 3 | None | 0.012 | 0.015 | Occurred |
| Example 4 | None | 0.011 | 0.014 | Occurred |
| Example 5 | None | 0.013 | 0.016 | Occurred |
| Example 6 | None | 0.015 | 0.017 | Occurred |
| Example 7 | None | 0.014 | 0.019 | Occurred |
| Example 8 | None | 0.016 | 0.018 | Occurred |
| Example 9 | None | 0.017 | 0.021 | Occurred |
| Example 10 | None | 0.019 | 0.021 | Occurred |
| Example 11 | None | 0.017 | 0.020 | Occurred |
| Example 12 | None | 0.016 | 0.019 | Occurred |
| Example 13 | None | 0.037 | 0.045 | Occurred |
| Example 14 | None | 0.076 | 0.087 | Occurred |
| Example 15 | None | 0.083 | 0.102 | Occurred |
| Example 16 | None | 0.085 | 0.110 | Occurred |
| Example 17 | None | 0.007 | 0.007 | None |
| Example 18 | None | 0.008 | 0.008 | None |
| Example 19 | None | 0.008 | 0.009 | None |
| Comparative Example 1 | Occurred | 0.012 | 0.015 | Occurred |
| Comparative Example 2 | None | 0.136 | 0.157 | Occurred |
| Comparative Example 3 | None | 0.175 | 0.192 | Occurred |
| Comparative Example 4 | None | 0.016 | 0.020 | Occurred |
| Comparative Example 5 | None | 0.017 | 0.022 | Occurred |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-200521, filed Dec. 2, 2020 and No. 2021-146787, filed Sep. 9, 2021, which are hereby incorporated by reference herein in their entirety.

What is claimed is:

1. External additive particles comprising a polymer containing a sulfur atom and a nitrogen atom,
   wherein the polymer includes a vinyl polymer moiety and a siloxane moiety,
   relative to a total number of carbon atoms, oxygen atoms, and silicon atoms constituting the external additive particles, a ratio of a number of the silicon atoms constituting the external additive particles is 4.0% or more and 25.0% or less,
   in surfaces of the external additive particles analyzed by X-ray photoelectron spectroscopy, relative to a total number of carbon atoms, nitrogen atoms, oxygen atoms, silicon atoms, and sulfur atoms, a ratio of a number of the nitrogen atoms is 0.40% or more and 2.50% or less, and a ratio of a number of the sulfur atoms is 0.05% or more and 0.25% or less, and
   the external additive particles subjected to $^{29}$Si-NMR measurement satisfy Formula (P1):

Integral value of Unit $T$/{(Integral value of Unit $M$)+ (Integral value of Unit $D$)+(Integral value of Unit $T$)+(Integral value of Unit $Q$)}≥60%    Formula (P1).

2. The external additive particles according to claim 1, wherein the polymer includes a monomer unit represented by Formula (1):

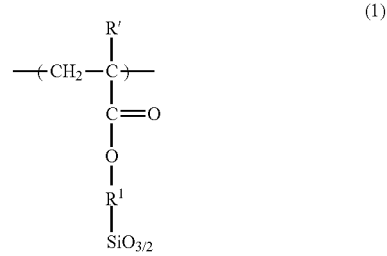

in Formula (1), $R^1$ is an alkylene group having 1 to 10 carbon atoms, and R' is a hydrogen atom or a methyl group.

3. The external additive particles according to claim 1, wherein a ratio of a number of the carbon atoms constituting the external additive particles to the number of the silicon atoms constituting the external additive particles is 6.5 or more.

4. The external additive particles according to claim 1, wherein the polymer includes at least one functional group selected from the group consisting of —SO$_3$H, —SO$_3$Na, —SO$_3$K, —OSO$_3$H, —OSO$_3$Na, and —OSO$_3$K, and an (alkyl)amino group.

5. The external additive particles according to claim 1, wherein the polymer includes a monomer unit represented by Formula(S):

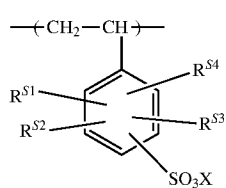

in Formula(S), R$^{S1}$ to R$^{S4}$ are each independently a hydrogen atom or a methyl group, and X is a hydrogen atom or an alkali metal atom.

6. The external additive particles according to claim 1, wherein, in the surfaces of the external additive particles analyzed by X-ray photoelectron spectroscopy, a ratio of the number of the nitrogen atoms to the number of the sulfur atoms is 2.0 or more.

7. The external additive particles according to claim 1, wherein the external additive particles subjected to $^{29}$Si-NMR measurement satisfy Formula (P1-2):

Integral value of Unit $T$/{(Integral value of Unit $M$)+ (Integral value of Unit $D$)+(Integral value of Unit $T$)+ (Integral value of Unit $Q$)} ≥ 90%.     Formula (P1-2)

8. The external additive particles according to claim 7, wherein the external additive particles subjected to $^{29}$Si-NMR measurement satisfy Formula (P2):

{(Integral value of Unit $T0$)+(Integral value of Unit $T1$)}/ {(Integral value of Unit $T0$)+(Integral value of Unit $T1$)+ (Integral value Unit $T2$)+(Integral value of Unit $T3$)} ≤ 0.1     Formula (P2)

9. The external additive particles according to claim 7, wherein the external additive particles subjected to $^{29}$Si-NMR measurement satisfy Formula (P3):

Integral value of Unit $T2$/{(Integral value of Unit $T0$)+ (Integral value of Unit $T1$)+(Integral value of Unit $T2$)+ (Integral value of Unit $T3$)} ≥ 0.35     Formula (P3)

10. The external additive particles according to claim 7, wherein, in the external additive particles subjected to $^{29}$Si-NMR measurement, a ratio of an integral value of Unit T2 to an integral value of Unit T3 is 1 or more.

11. The external additive particles according to claim 1, wherein a particle size of the external additive particles at 50% of a volume-based distribution is defined as D50, and D50 is 50 nm or more and 200 nm or less.

12. The external additive particles according to claim 1, wherein the polymer is a polymer in which a vinyl polymer is crosslinked with a siloxane bond.

13. A toner comprising a toner particle and external additive particles on a surface of the toner particle, wherein
the external additive particles comprise a polymer containing a sulfur atom and a nitrogen atom,
the polymer includes a vinyl polymer moiety and a siloxane moiety,
relative to a total number of carbon atoms, oxygen atoms, and silicon atoms constituting the external additive particles, a ratio of a number of the silicon atoms constituting the external additive particles is 4.0% or more and 25.0% or less, and
in surfaces of the external additive particles analyzed by X-ray photoelectron spectroscopy, relative to a total number of carbon atoms, nitrogen atoms, oxygen atoms, silicon atoms, and sulfur atoms, a ratio of a number of the nitrogen atoms is 0.40% or more and 2.50% or less, and a ratio of a number of the sulfur atoms is 0.05% or more and 0.25% or less, and
the external additive particles subjected to $^{29}$Si-NMR measurement satisfy Formula (P1):

Integral value of Unit $T$/{(Integral value of Unit $M$)+ (Integral value of Unit $D$)+(Integral value of Unit $T$)+ (Integral value of Unit $Q$)} ≥ 60%.     Formula (P1)

* * * * *